Oct. 22, 1935.  V. E. HOFMANN  2,018,021
MACHINE FOR MOLDING GLASS ARTICLES
Filed May 31, 1933  8 Sheets-Sheet 1
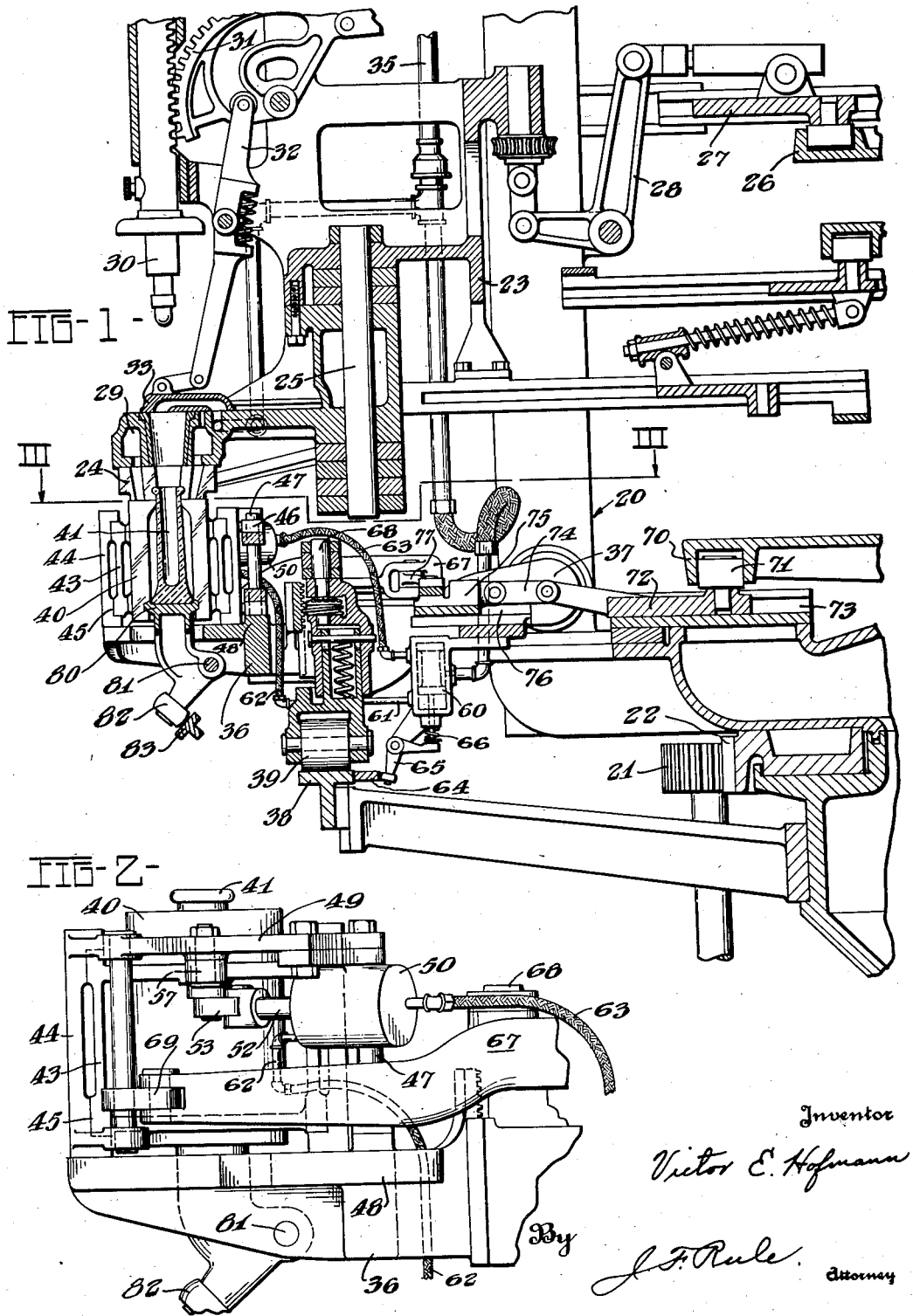

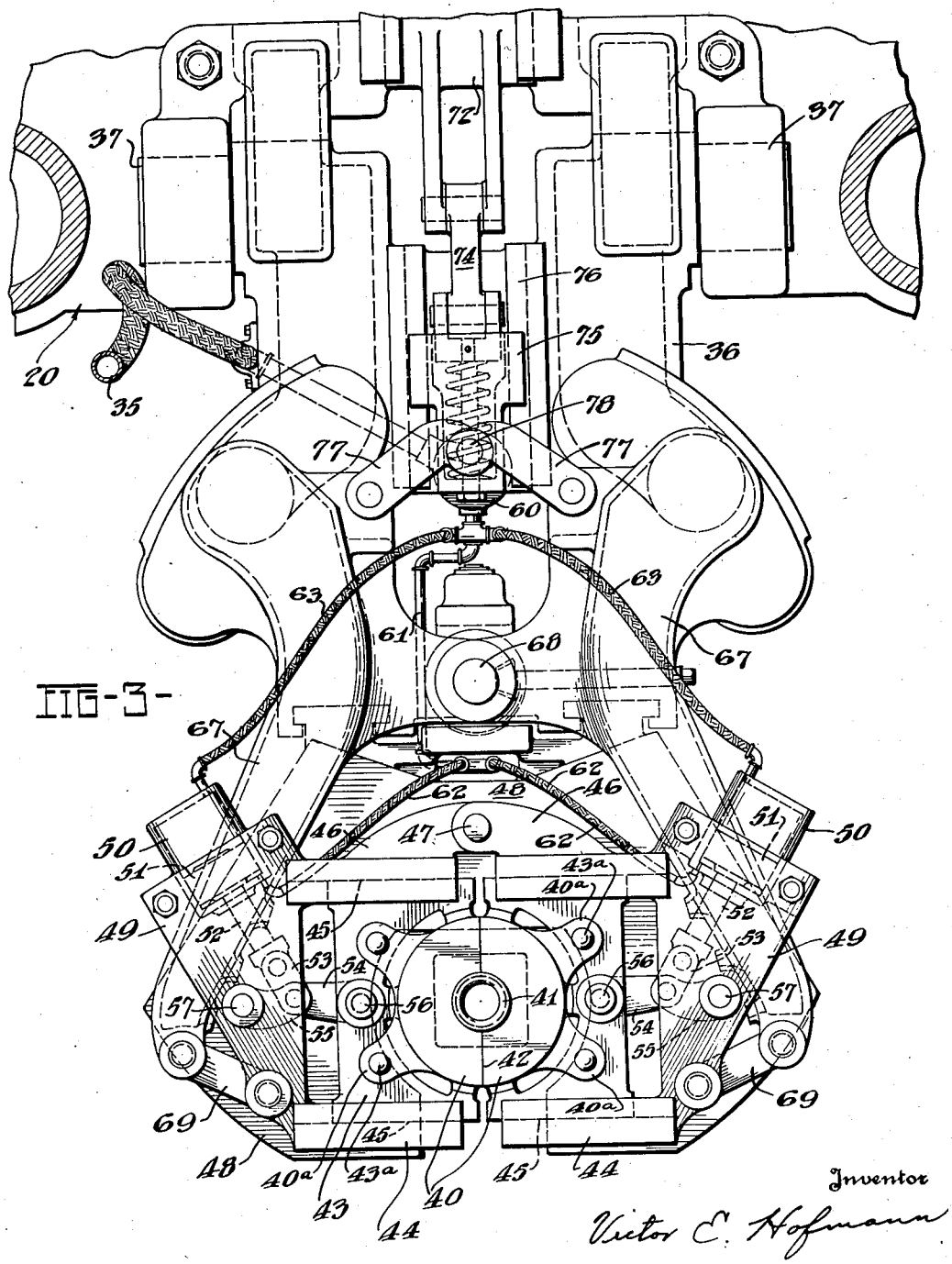

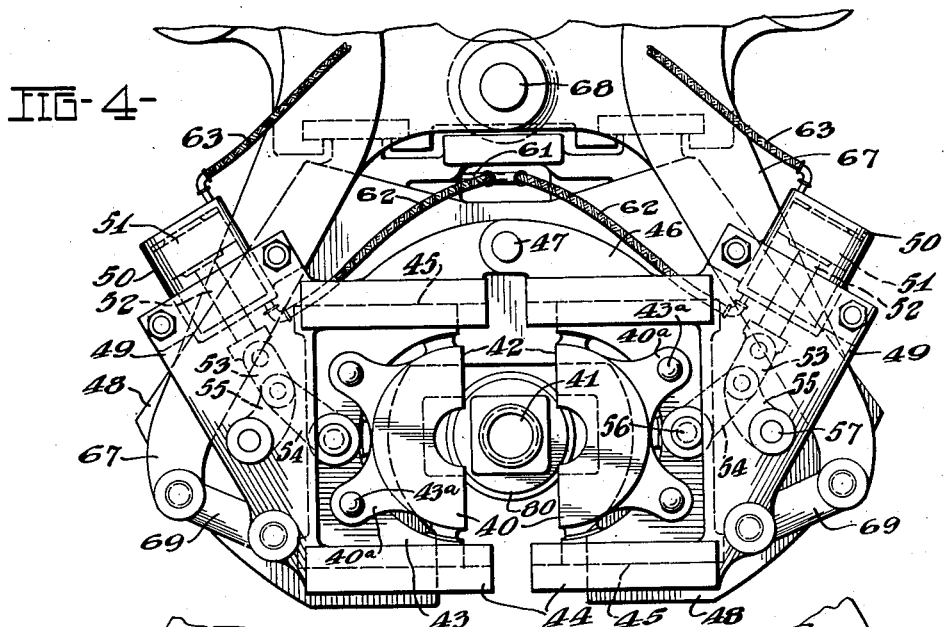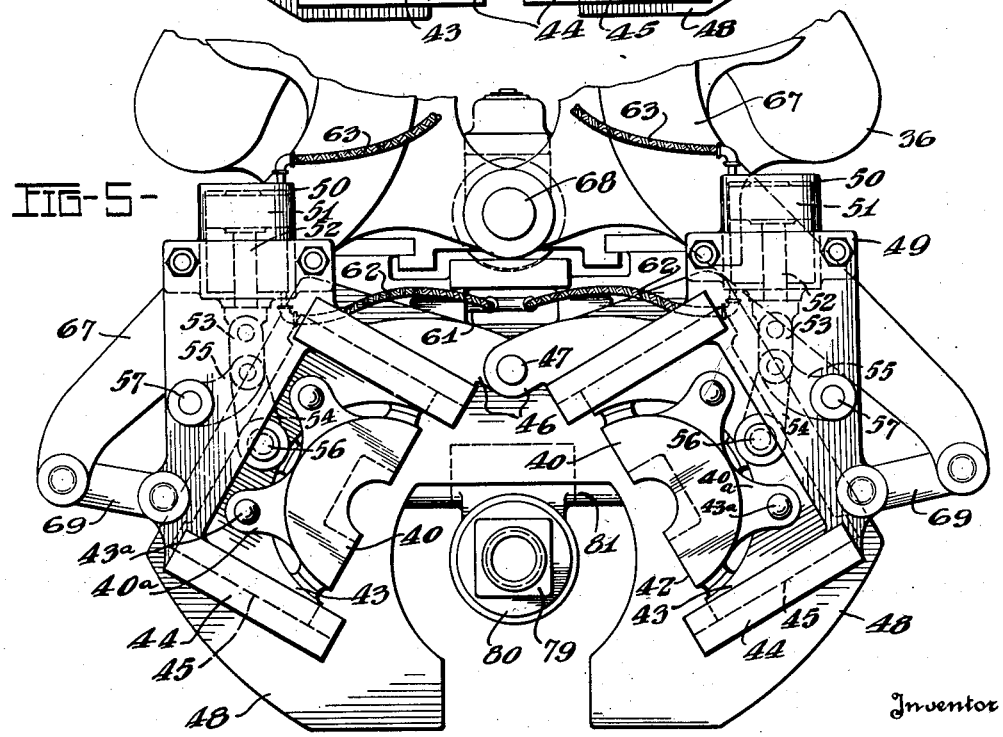

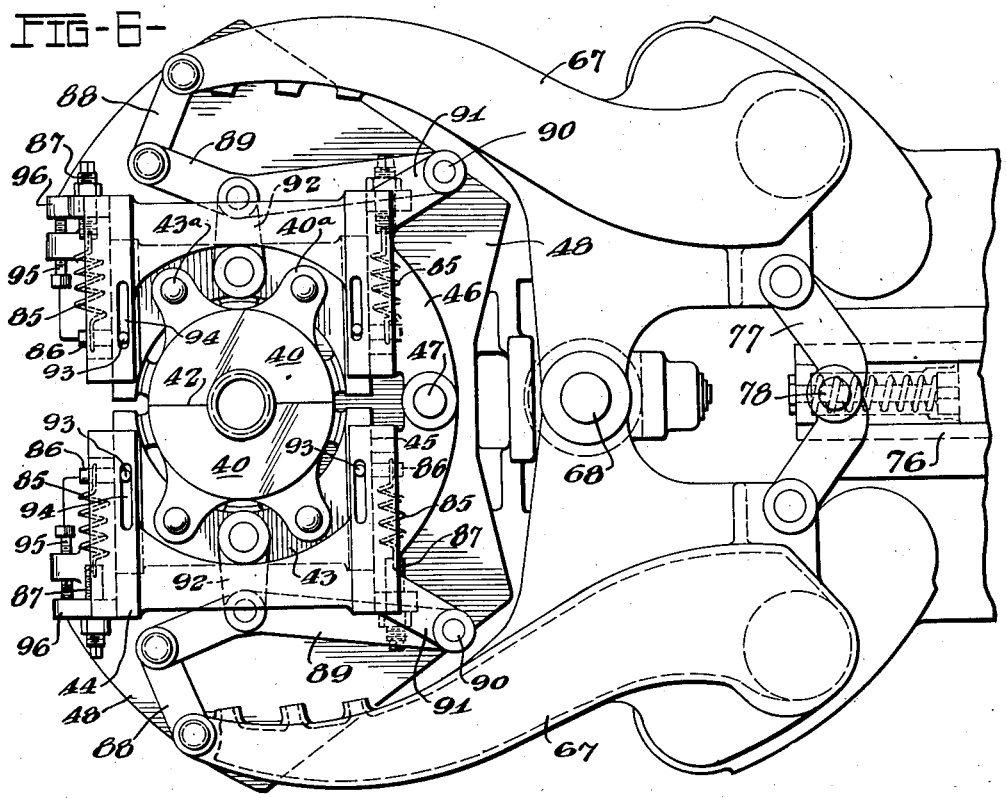

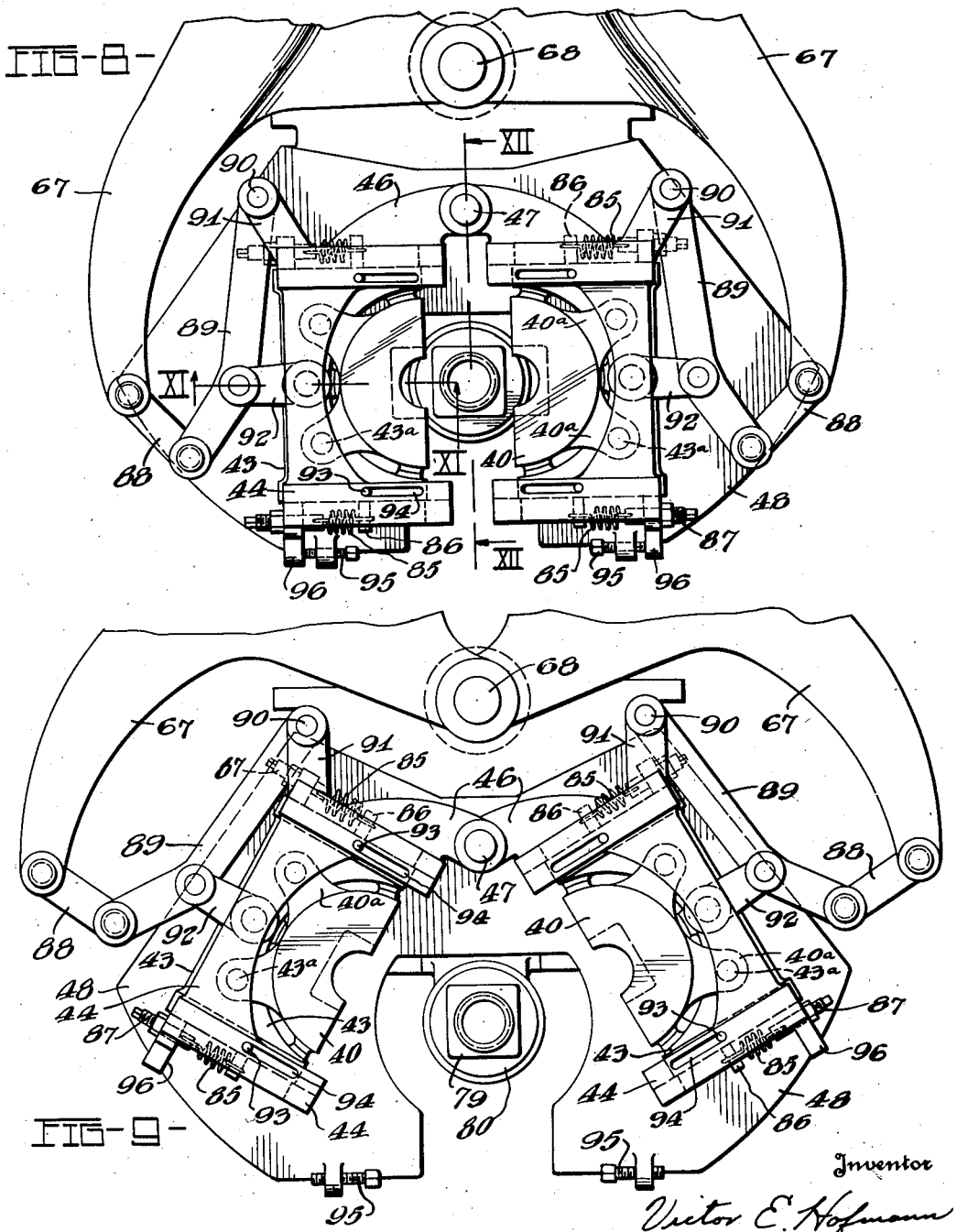

Oct. 22, 1935.　　　V. E. HOFMANN　　　2,018,021
MACHINE FOR MOLDING GLASS ARTICLES
Filed May 31, 1933　　8 Sheets-Sheet 6
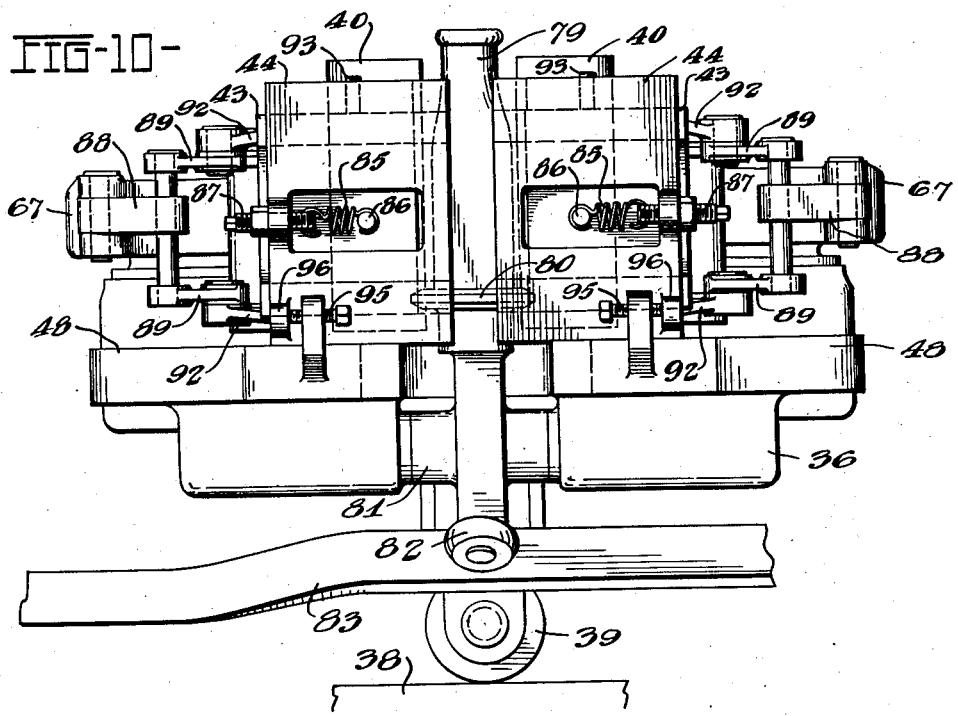
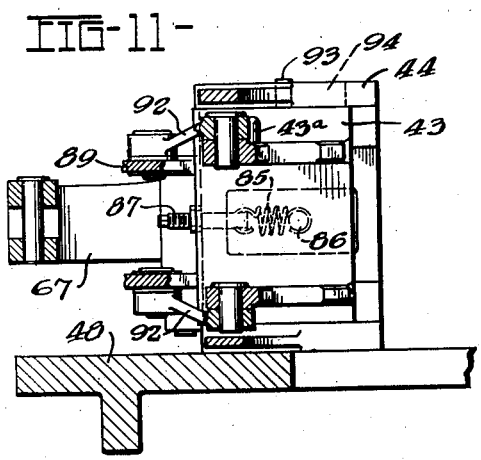
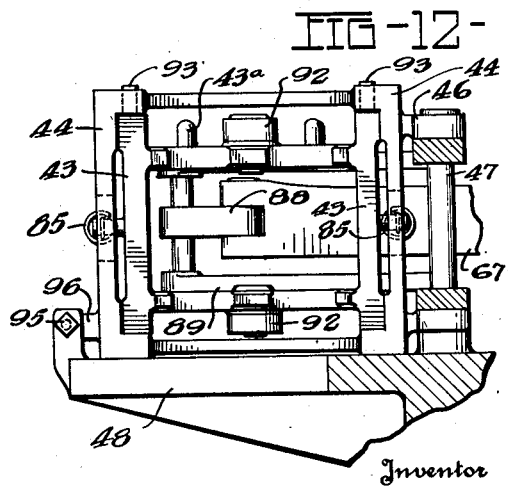

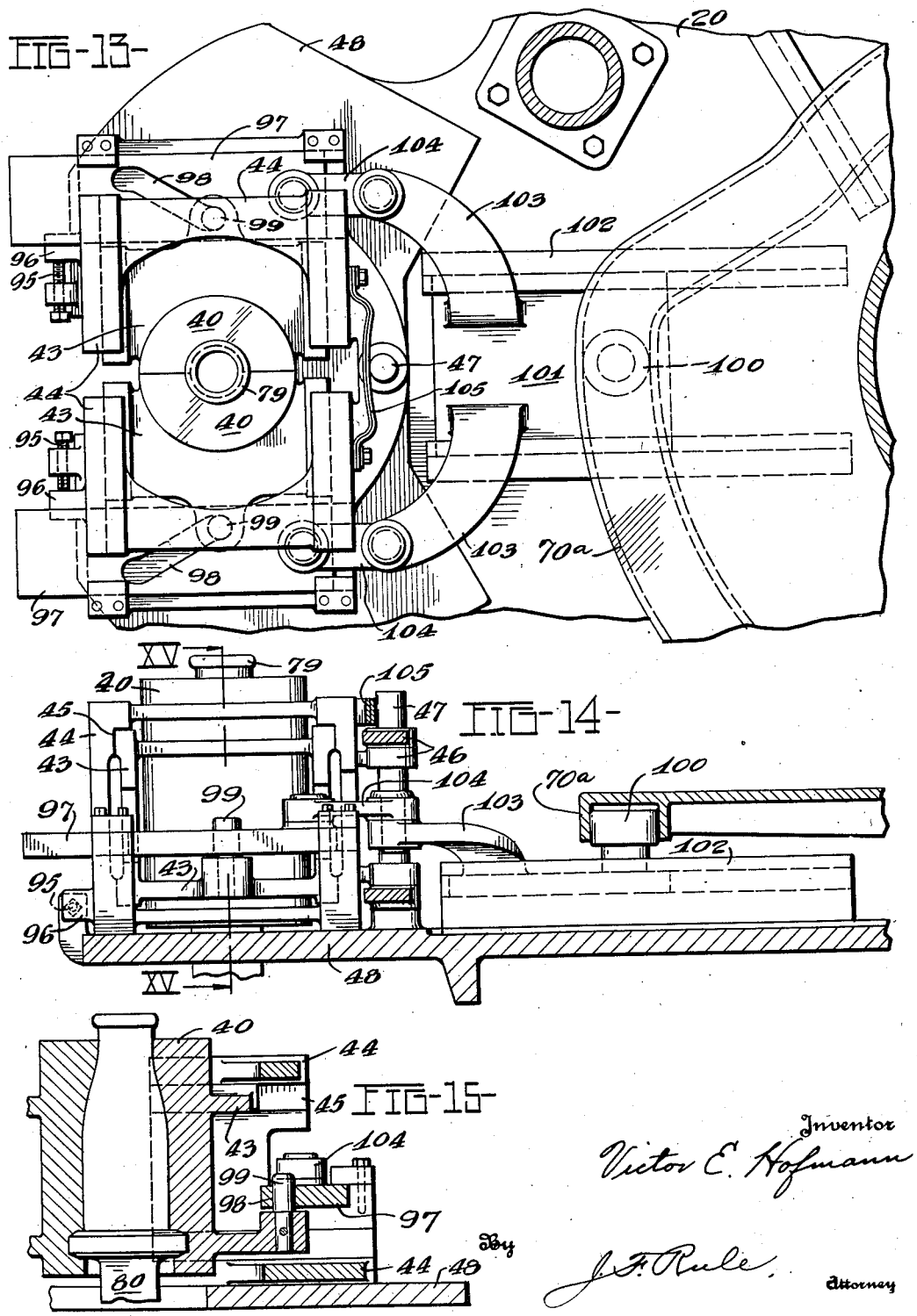

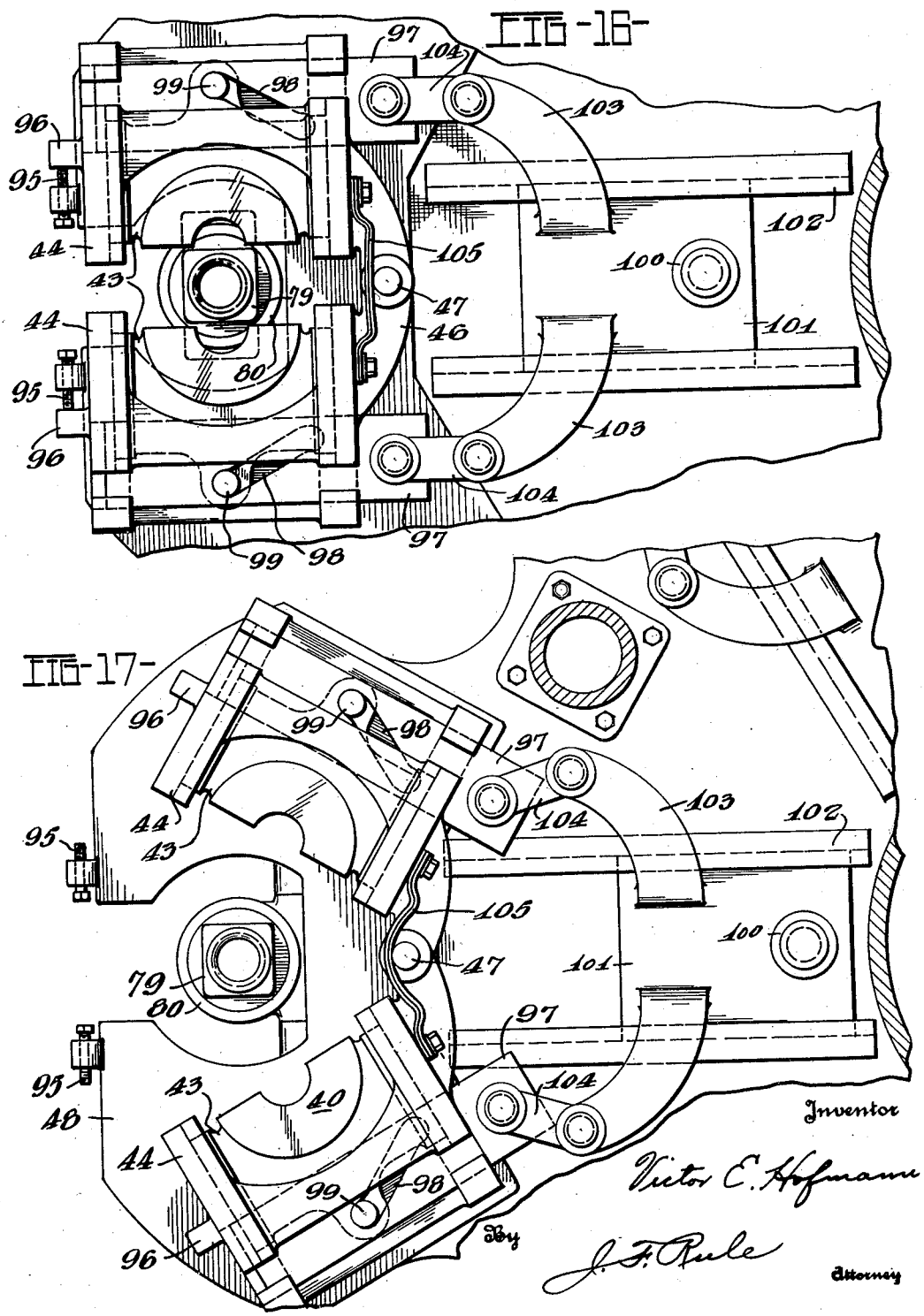

Patented Oct. 22, 1935

2,018,021

UNITED STATES PATENT OFFICE 2,018,021

MACHINE FOR MOLDING GLASS ARTICLES

Victor E. Hofmann, Toledo, Ohio, assignor to Owens-Illinois Glass Company, a corporation of Ohio Application May 31, 1933, Serial No. 673,645

19 Claims. (Cl. 49—9)

My invention relates to machines for molding glassware including bottles, jars and various other articles, and particularly to those types of machines in which the molds are made in partible sections. In such machines the partible mold halves or sections are ordinarily mounted on pivoted arms, the mold sections being separated by a pivotal movement of the mold carrying arms, so that the mold sections move in arcs of circles as they are separated. In the manufacture of many different shapes of bottles and other articles of irregular shapes, and also articles having lettering or other surface ornamentation, considerable difficulty has been experienced owing to the tendency of the molds to distort the ware or molded surfaces when the mold sections are separated in the manner above noted. Also when the molds are separated by a pivotal movement, there is often a binding action which causes the molded article to stick to the mold. An object of the present invention is to overcome such difficulties and objections and also provide a construction which will permit deeper lettering and surface ornamentation of the molded articles without distortion.

My invention provides means by which the partible mold halves can be given an initial opening movement in a straight line, an object of the invention being to provide such means in a construction embodying comparatively slight modifications of machines or mold operating mechanism of standard construction.

In the manufacture of panel ware or other articles which are substantially square or rectangular in cross section, it is common practice to cut the mold cavities diagonally in the molds in such manner that the inner faces of the mold sections meet along the corners of the article. This has been found necessary in order to permit separation of the mold halves without distorting the molded article. An object of the present invention is to provide a construction permitting the mold cavities to be arranged normally to the meeting faces of the mold so that the sides of such rectangular articles will be parallel with and perpendicular to the meeting faces of the mold sections. This materially simplifies and facilitates the cutting of the molds, permits surface ornamentation, lettering, etc., which is impractical or impossible with the diagonal arrangement, and possesses various other advantages.

Other objects of the invention will appear hereinafter.

In the accompanying drawings:

Fig. 1 is a sectional elevation of one head or unit of an Owens type suction gathering machine to which the present invention is applied.

Fig. 2 is a fragmentary side elevation of a finishing mold unit comprising a finishing mold and its operating mechanism.

Fig. 3 is a part sectional plan view taken at the line III—III on Fig. 1, showing the finishing mold unit.

Fig. 4 is a view similar to Fig. 3, but with the mold sections separated a short distance by their straight line movement from a closed position.

Fig. 5 is a similar view with the molds fully opened.

Figs. 6 to 12, inclusive, illustrate a modified construction in which the initial opening movement of the mold sections is controlled by springs instead of air motors.

Fig. 6 is a plan view of the finishing mold unit, the mold being shown in closed position.

Fig. 7 is a side elevation of the same.

Fig. 8 is a view similar to Fig. 6, but with the mold sections drawn apart to the position assumed at the completion of their straight line movement.

Fig. 9 is a front elevation showing the mold fully opened.

Fig. 10 is a front elevation of the finishing mold unit with the mold sections in the position shown in Fig. 8.

Fig. 11 is a sectional elevation at the line XI—XI on Fig. 8, but with the mold section removed.

Fig. 12 is a section at the line XII—XII on Fig. 8, with the mold section removed.

Figs. 13 to 17 illustrate a further modification in which the initial opening movement of the mold is effected by means of cams.

Fig. 13 is a plan view of the mold unit.

Fig. 14 is a sectional side elevation.

Fig. 15 is a section at the line XV—XV on Fig. 14.

Fig. 16 is a plan view similar to Fig. 13, but with the mold sections separated by their straight line movement.

Fig. 17 is a similar view, but with the mold fully opened.

Referring particularly to Figs. 1 to 5, the invention is shown as embodied in an Owens type suction gathering machine. The machine comprises a mold carriage 20 rotated continuously about a vertical axis by means of a driving pinion 21 which meshes with a ring gear 22 on the mold carriage. The machine includes an annular series of heads or mold units, only one of which is herein shown, each comprising a dip frame 23 mounted for up and down movement on the mold carriage for lifting and lowering the parison mold. The latter includes a body blank mold (not shown), and a neck mold 24, each comprising a pair of separable sections mounted on arms which swing about a pivot pin 25 for opening and closing the molds. The dip frame 23 is lifted and lowered by means of a stationary cam 26 having operating connections with the dip frame through a slide block 27 and bell crank lever 28. When the dip frame is lowered, the combined neck mold and body blank mold gather their charge of glass by suction from a pool of molten glass, the suction being applied to the mold through a head 29. A plunger 30 operates in a well known manner to form an initial blow opening in the parison, the plunger being lowered by a rack and gear segment 31. The latter is formed with a cam which operates through a lever 32 for moving a blow slide valve 33 to and from a position for supplying air under pressure to the molds for blowing the parison, the air being supplied through a pipe 35.

Cooperating with each blank mold unit is a finishing mold unit comprising a mold carrying frame 36 having trunnions 37 by which it is mounted to swing up and down about a horizontal axis, said swinging movements being controlled by a stationary cam track 38 on which runs a roll 39 carried by the frame 36. The finishing mold 40 comprises separable sections adapted to be closed about a parison 41 suspended from the neck mold after the body blank mold is opened and the finishing mold has swung upward as shown in Fig. 1. The parts thus far described may be of standard construction and do not in themselves form a part of the present invention.

The partible mold sections 40 may, as usual, have their inner faces 42 meet in a vertical plane radial to the mold carriage. The mold sections are removably mounted on a pair of slide blocks or frames 43, the latter having pins 43ª which extend through perforated lugs 40ª on the mold sections. The slides 43 are slidably mounted in carriers 44, the latter formed with guideways 45 by which the slide blocks 43 are guided and given a straight line movement in said carriers. The carriers 44 are formed with arms 46 pivotaly connected by a pivot pin 47 extending upward from a supporting plate 48.

Each of the carriers 44 is formed with an extension 49 on the under side of which an air motor 50 is mounted. The motor piston is connected through a piston rod 52 and link 53 to a pair of toggle links 54 and 55. The link 54 is connected by a pivot 56 to the slide block 43 and the link 55 is connected by a pivot 57 to the extension 49 of the carrier 44.

The air motors 50 are actuated by air supplied through the pressure pipe 35 (Fig. 1) under the control of a valve 60. Air is conducted from the valve to the inner ends of the motor cylinders through a pipe 61 and branch pipes 62. Pipes 63 extend from the outer ends of the motor cylinders and are connected to the upper end of the valve cylinder. The valve is controlled by a stationary cam 64 which operates through a bell crank 65 to lift the valve. The valve is lowered by a spring 66. The air motors 50 operate to impart an initial opening movement to the mold, by moving the slide blocks outwardly to the position shown in Fig. 4, as more fully pointed out hereinafter. The final opening movement of the mold is effected by a pair of mold operating levers 67 which swing about a pivot pin 68. The outer ends of the levers are connected through links 69 to the carriers 44. The levers 67 are actuated by a stationary cam 70 (Fig. 1) on which runs a roll 71 carried by a slide block 72 movable radially of the machine in guides 73. A link 74 connects the slide block 72 with a slide block 75 which runs on guide rails 76 on the finishing mold frame 36. A pair of links 77 are pivoted at their outer ends to the mold operating levers 67, said links being connected by a pivot pin 78 to the slide block 75. When the slide block 72 is moved inward toward the axis of the machine by the cam 70, it operates through the connections just described to swing the mold operating levers 67 about their pivot 68 and thereby swing the mold carriers 44 about their pivot 47 to the Fig. 5 position, thus separating the mold sections to a wide open position.

The operation of the mechanism shown in Figs. 1 to 5 will be understood from the foregoing description, but may be summarized as follows: Assuming a parison 41 has been formed in the usual manner and the finishing mold 40 has been closed around the parison while the latter is suspended in the neck mold, the parts being now in the position shown in Figs. 1 and 3, the parison is blown as usual to its finished form in the finishing mold by air supplied from the pipe 35 through the valve 33. After the article has been thus blown and is cooled sufficiently to retain its shape, the finishing mold is opened. The initial opening movement of the mold is effected by the air motors 50 to which air is supplied through the valve 60 (Fig.1) under the control of the cam 64. The cam holds the valve in its upper position while the finishing mold remains closed. The opening of the mold is initiated when the bell crank 65 runs off the cam, permitting the spring 66 to lower the valve. This opens the air pressure line 35 through the pipes 61 and 62 to the inner ends of the motor cylinders so that the pistons 51 are moved outwardly and operate through the connections 52 to 54 to move the slides 43 outwardly, thus separating the mold sections as shown in Fig. 4. The cam 70 then operates the levers 67 in the manner heretofore described and thereby swings the mold carriers 44 outwardly about their pivot 47 to the Fig. 5 position in which the mold is wide open. This leaves the bottle or other blown article 79 supported on a mold bottom 80 which is pivoted at 81 to the frame 36 and carries a cam roll 82 running on a stationary cam 83. The latter is shaped to tilt the mold bottom and discharge the article after the mold is fully opened.

It will be observed that the body of the bottle 79 is substantially square and that the initial opening movement of the mold sections being in a straight line, permits them to be withdrawn from the bottle without distortion of the latter and without its binding in the mold. The mold cavities are also cut in the molds with their inner or back surfaces parallel with the meeting faces of the mold sections, and their side faces perpendicular thereto.

Figs. 6 to 12 illustrate a modified construction in which the straight line movements of the mold sections are spring actuated and controlled, the air motors being omitted. In this construction, the slide frames 43 on which the mold sections 40 are mounted are moved outwardly for separating the mold sections by coil springs 85. Each of these springs is connected at one end to a pin 86 on the slide block and at its other end is anchored to a post 87 adjustably mounted in the carrier 44. The mold operating levers 67 are connected through links 88 to the outer ends of swinging frames 89 which function as levers, the inner ends of which are pivoted on pivot pins 90 supported in arms 91 on the carriers 44. Links 92 are pivoted at their inner ends to the slide frames 43 and at their outer ends are pivoted to the lever frames 89.

When the mold operating levers 67 are actuated for opening the mold, they operate through the links 88 to swing the levers 89 outwardly about their pivots. The slide frames 43 being connected to the levers 89 are thus moved outwardly while the carriers 44 remain stationary. This outward movement of the slide frames is limited by stop pins 93 carried by the slide frames and working in slots 94 in the carriers 44. The springs 85 assist in the opening movement of the slide frames 43 with the mold sections thereon and at the same time oppose any opening movement of the carriers 44 about their pivot 47. The springs 85 may be considered as the motivating element for effecting the initial or bodily movement of the mold sections toward open position. In other words, the springs 85 are exerting an outward pull on the slide blocks 43 and this is transmitted through the links 92 and levers 89 to the levers 67. When the slide frames 43 reach the limit of their outward movement relative to the carriers 44 the continued movement of the levers 67 operates to swing said carriers about their pivot 47 for completing the opening movement of the mold. Stop screws 95 are adjustably mounted in the supporting plate 48 in position to engage stop lugs 96 on the carriers 44. These stop screws prevent the carriers from swinging inward beyond their normal position assumed while the mold is closed.

Figs. 13 to 17 illustrate a further modification which will now be described. The movements of the mold carrying slide frames 43 in the carriers 44 are controlled by slide plates 97 mounted for reciprocating movement on the carriers 44. Said slide plates are provided with cam slots 98. Pins 99 on the slides 43 extend upwardly through the slots 98. A stationary cam 70ᵃ controls the opening and closing movements of the mold. A cam roll 100 running on said cam is carried by a slide block 101 mounted for movement in guides 102. Arms 103 fixed to the slide block are connected through links 104 to the slide plates 97. When the slide block 101 is moved inwardly by its cam from the Fig. 13 position, the slide plates 97 are moved to the right, causing the cams 98 to separate the mold sections, the parts being thus brought to the Fig. 16 position. Continued movement of the slide block 101 then swings the mold carriers about their pivot 47 and thus fully opens the mold. Leaf springs 105 are attached to the carriers 44 and tend to hold them in their inner or closed position determined by the stops 95, thus preventing premature movement of the carriers during the initial opening movement of the mold sections.

Modifications may be resorted to within the spirit and scope of my invention.

What I claim is:

1. A machine for forming glass articles comprising a mold including separable sections having meeting faces, and mechanism for opening the mold comprising automatic means for moving the mold sections bodily from each other in a straight path during the initial opening movement, and means for then automatically moving the mold sections farther apart in a curved path for completing the opening movement of the mold.

2. In a machine for forming glass articles, a mold comprising separable sections having meeting faces, and mechanism for opening the mold including automatic means for separating the mold sections by a straight line bodily movement of one section relative to the other, and means for swinging one said mold section relative to the other through an arc of a circle and thereby completing its opening movement.

3. The combination of a mold comprising separable sections having meeting faces, slides on which said sections are mounted, carriers in which said slides are slidably mounted for relative bodily movement, mechanism for effecting a synchronized movement of the slides in the carriers and means for swinging each said carrier about an axis.

4. The combination of a mold comprising separable sections having meeting faces, slides on which said sections are mounted, carriers in which said slides are slidably mounted for relative bodily movement, mechanism for effecting a synchronized movement of the slides in the carriers and means for swinging the carriers toward and from each other about a common axis.

5. The combination of a mold carriage rotative about a vertical axis, a mold comprising separable sections, slides on which the mold sections are mounted, carriers on which the slides are mounted for synchronized, straight line, bodily movement toward and from each other in a horizontal direction tangential to the mold carriage, means for causing said synchronized movement of the slides on the carriers and thereby moving the mold sections bodily to and from each other, said carriers being mounted for movement toward and from each other on the mold carriage, operating levers connected to said carriers, and a stationary cam for actuating said levers.

6. The combination of a mold carriage rotative about a vertical axis, a mold comprising separable sections, slides on which the mold sections are mounted, carriers on which the slides are mounted for synchronized, straight line, bodily movement toward and from each other in a horizontal direction tangential to the mold carriage, means for causing said synchronized movement of the slides on the carriers and thereby moving the mold sections bodily to and from each other, said carriers being pivotally mounted for swinging movement toward and from each other on the mold carriage, operating levers connected to said carriers, and a stationary cam for actuating said levers.

7. The combination of a mold comprising partible sections having their meeting faces in a plane, carriers supporting the mold sections, said carriers being mounted for movement toward and away from each other, means for imparting an initial opening movement to the mold by a relative straight line bodily movement to the mold sections away from each other while the mold carriers retain a fixed relative position, and means for then moving the carriers apart and thereby completing the opening movement of the mold.

8. The combination of a mold comprising partible sections having their meeting faces in a plane, carriers supporting the mold sections and mounted for swinging movement about an axis in said plane, means for imparting an initial opening movement to the mold by a relative straight line bodily movement of the mold sections away from each other while the mold carriers retain a fixed relative position, and means for then swinging the carriers about said axis and thereby completing the opening movement of the mold.

9. The combination of a mold comprising partible sections having their meeting faces in a plane, carriers supporting the mold sections, means for imparting an initial opening movement to the mold by a relative straight line bodily movement to the mold sections away from each other while the mold carriers retain a fixed relative position, said carriers mounted to swing about an axis in said plane, a pair of operating levers mounted to swing about a different axis in said plane, said operating levers operatively connected to said carriers, and means for actuating said levers after said initial opening movement of the mold and thereby completing the opening of the mold.

10. The combination of a mold comprising separable sections having their meeting faces in a plane, slides on which the mold sections are mounted, carriers mounted for pivotal movement and having slideways in which the slides are mounted, said slideways being perpendicular to said plane, means for moving said slides in said slideways for imparting an initial opening movement to the mold, and means for pivotally moving said carriers for completing the opening movement of the mold.

11. The combination of a mold comprising partible sections, slides carrying the mold sections, carriers in which the slides are mounted for sliding movement, said carriers mounted for pivotal movement toward and from each other, piston motors mounted on said carriers, operating connections between said motors and the slides for moving the latter relative to the carriers, and means for effecting said pivotal movement of the carriers.

12. The combination of a mold comprising partible sections, slides on which the mold sections are mounted, carriers in which said slides are mounted, said carriers being mounted for swinging movement toward and from each other, springs interposed between the slides and carriers and exerting a tension on the slides tending to separate the mold sections, means for holding the mold sections together in opposition to said springs, means for releasing the slides to the action of said springs and thereby imparting an initial opening movement to the molds, and means for then swinging the carriers apart and thereby completing the opening movement of the mold.

13. The combination of a mold carriage rotatable about a vertical axis, a mold comprising partible sections having their meeting faces in a vertical plane radial to the mold carriage, slides carrying said mold sections, means for effecting straight line movement of said slides, carriers in which said slides are mounted for said straight line movement to and from each other in a direction perpendicular to said plane, said carriers being mounted on the mold carriage for swinging movement toward and from each other, and means for effecting said swinging movement of the carriers.

14. The combination of a mold carriage rotatable about a vertical axis, a mold comprising partible sections having their meeting faces in a vertical plane radial to the mold carriage, slides carrying said mold sections, carriers in which said slides are mounted for straight line movement to and from each other in a direction perpendicular to said plane, said carriers mounted on the mold carriage for swinging movement about an axis in said plane, means for moving the slides in the carriers and thereby imparting an initial opening movement to the mold, and means for then swinging the carriers apart and thereby completing the opening movement of the mold.

15. The combination of a mold carriage rotatable about a vertical axis, a mold comprising partible sections having their meeting faces in a vertical plane radial to the mold carriage, slides carrying said mold sections, carriers in which said slides are mounted for straight line movement to and from each other in a direction perpendicular to said plane, said carriers mounted on the mold carriage for swinging movement about an axis in said plane, means for moving the slides in the carriers and thereby imparting an initial opening movement to the mold, means for then swinging the carriers apart and thereby completing the opening movement of the mold, said last mentioned means including operating levers mounted on the carriage to swing about an axis in said plane, said levers operatively connected to said carriers, a stationary cam, and operating connections between the cam and said operating levers.

16. The combination of a mold comprising partible sections having their meeting faces in a plane, carriers mounted for swinging movement and supporting the mold sections, means for imparting an initial opening movement to the mold by a relative straight line bodily movement to the mold sections away from each other while the mold carriers retain a fixed relative position, and means for then swinging the carriers apart and thereby completing the opening movement of the mold.

17. A machine for forming glass articles, comprising a mold having separable sections with their meeting faces in a plane, and mechanism for opening the mold including means for moving said mold sections bodily away from each other in a straight path in a direction perpendicular to said plane during the initial opening movement of the mold and means for then moving and guiding the mold sections in a curved path for completing the opening movement of the mold.

18. A machine for forming glass articles comprising, in combination, a traveling mold carriage, a mold having separable sections, and mechanism controlled by the movement of the mold carriage operable to open the mold, said mechanism comprising automatic means for moving each mold section bodily from the other in a straight path during the initial opening movement, and means for then moving the mold sections in a curved path for completing the opening movement of the mold.

19. In a machine for forming glass articles, a mold comprising separable sections having their meeting faces in a plane, and mechanism for opening the mold including automatic means for separating the mold sections by a straight line bodily movement of one section relative to the other in a direction perpendicular to said plane and means for swinging and guiding a mold section through an arc of a circle and thereby completing its opening movement.

VICTOR E. HOFMANN.